US010072348B2

(12) United States Patent
Shinohara et al.

(10) Patent No.: US 10,072,348 B2
(45) Date of Patent: Sep. 11, 2018

(54) SILVER-PLATED PRODUCT

(71) Applicant: DOWA METALTECH CO., LTD., Tokyo (JP)

(72) Inventors: Keisuke Shinohara, Saitama (JP); Masafumi Ogata, Saitama (JP); Hiroshi Miyazawa, Saitama (JP); Akira Sugawara, Shizuoka (JP)

(73) Assignee: DOWA METALTECH CO., LTD., Tokyo (JP)

( * ) Notice: Subject to any disclaimer, the term of this patent is extended or adjusted under 35 U.S.C. 154(b) by 192 days.

(21) Appl. No.: 14/777,706

(22) PCT Filed: Feb. 18, 2014

(86) PCT No.: PCT/JP2014/054253

§ 371 (c)(1),
(2) Date: Sep. 16, 2015

(87) PCT Pub. No.: WO2014/148201

PCT Pub. Date: Sep. 25, 2014

(65) Prior Publication Data

US 2016/0273120 A1 Sep. 22, 2016

(30) Foreign Application Priority Data

Mar. 18, 2013 (JP) ................................ 2013-054877

(51) Int. Cl.

| | |
|---|---|
| ***B32B 15/01*** | (2006.01) |
| ***C25D 5/14*** | (2006.01) |
| ***C25D 3/46*** | (2006.01) |
| ***C25D 5/12*** | (2006.01) |
| ***C25D 7/00*** | (2006.01) |
| ***C25D 3/12*** | (2006.01) |
| ***C25D 5/34*** | (2006.01) |
| *H01H 1/04* | (2006.01) |

(52) U.S. Cl.

CPC ................ *C25D 5/14* (2013.01); *C25D 3/12* (2013.01); *C25D 3/46* (2013.01); *C25D 5/12* (2013.01); *C25D 5/34* (2013.01); *C25D 7/00* (2013.01); *H01H 1/04* (2013.01)

(58) Field of Classification Search

None

See application file for complete search history.

(56) References Cited

U.S. PATENT DOCUMENTS

2015/0243408 A1 8/2015 Shinohara et al.

FOREIGN PATENT DOCUMENTS

| | | | | |
|---|---|---|---|---|
| JP | 3889718 | B2 | | 12/2006 |
| JP | 4279285 | B2 | | 3/2009 |
| JP | 2010-146925 | A | | 7/2010 |
| JP | 2012-162775 | A | | 8/2012 |
| JP | 2012162775 | | * | 8/2012 |
| WO | 2013/047628 | A1 | | 4/2013 |

OTHER PUBLICATIONS

International Search Report for PCT/JP2014/054253 dated May 12, 2014.

* cited by examiner

*Primary Examiner* — Daniel J Schleis

(74) *Attorney, Agent, or Firm* — Bachman & LaPointe, PC

(57) ABSTRACT

There is provided a silver-plated product wherein a surface layer of silver is formed on the surface of an underlying layer of nickel formed on a base material, the silver-plated product having a good bendability. In a silver-plated product which comprises a base material of copper or a copper alloy, an underlying layer of nickel formed on the base material, and a surface layer of silver formed on the surface of the underlying layer, the surface layer having a thickness of 10 μm or less, the thickness of the underlying layer is 2 μm or less, preferably 1.5 μm or less, and the area fraction in {200} orientation of the surface layer is 15% or more, preferably 25% or more.

3 Claims, No Drawings

SILVER-PLATED PRODUCT

TECHNICAL FIELD

The present invention generally relates to a silver-plated product. More specifically, the invention relates to a silver-plated product used as the material of contact and terminal parts, such as connectors, switches and relays, which are used for automotive and/or household electric wiring.

BACKGROUND ART

As conventional materials of contact and terminal parts, such as connectors and switches, there are used plated products wherein a base material of stainless steel, copper, a copper alloy or the like, which is relatively inexpensive and which has excellent corrosion resistance, mechanical characteristics and so forth, is plated with tin, silver, gold or the like in accordance with required characteristics, such as electrical and soldering characteristics.

Tin-plated products obtained by plating a base material of stainless steel, copper, a copper alloy or the like, with tin are inexpensive, but they do not have good corrosion resistance. Gold-plated products obtained by plating such a base material with gold have excellent corrosion resistance and high reliability, but the costs thereof are high. On the other hand, silver-plated products obtained by plating such a base material with silver are inexpensive in comparison with gold-plated products and have excellent corrosion resistance in comparison with tin-plated products.

As such a silver-plated product, there is proposed a metal plate for electrical contacts, wherein a silver plating film having a thickness of 1 μm is formed on a copper plating film having a thickness of 0.1 to 0.5 μm which is formed on a nickel plating film having a thickness of 0.1 to 0.3 μm which is formed on the surface of a thin base material plate of stainless steel (see, e.g., Japanese Patent No. 3889718). There is also proposed a silver-coated stainless bar for movable contacts, wherein a surface layer of silver or a silver alloy having a thickness of 0.5 to 2.0 μm is formed on an intermediate layer of at least one of nickel, a nickel alloy, copper and a copper alloy having a thickness of 0.05 to 0.2 μm, the intermediate layer being formed on an activated underlying layer of nickel which has a thickness of 0.01 to 0.1 μm and which is formed on the surface of a base material of stainless steel (see, e.g., Japanese Patent No.4279285). Moreover, there is proposed a silver-coated material for movable contact parts, wherein a surface layer of silver or a silver alloy having a thickness of 0.2 to 1.5 μm is formed on an intermediate layer of copper or a copper alloy having a thickness of 0.01 to 0.2 μm, the intermediate layer being formed on an underlying layer of any one of nickel, a nickel alloy, cobalt or a cobalt alloy which has a thickness of 0.005 to 0.1 μm and which is formed on a metallic substrate of copper, a copper alloy, iron or an iron alloy, and wherein the arithmetic average roughness Ra of the metallic substrate is 0.001 to 0.2 μm, and the arithmetic average roughness Ra after forming the intermediate layer is 0.001 to 0.1 μm (see, e.g., Japanese patent Laid-Open No. 2010-146925).

However, if an underlying layer of nickel is formed on a base material of such a conventional silver-plated product, there is some possibility that the bendability thereof may be remarkably deteriorated, so that there is a problem in that cracks are formed in the silver-plated product to expose the base material when the silver-plated product is worked in a complicated shape or in a shape of small contact and terminal parts, such as connectors and switches.

DISCLOSURE OF THE INVENTION

It is therefore an object of the present invention to eliminate the above-described conventional problems and to provide a silver-plated product wherein a surface layer of silver is formed on the surface of an underlying layer of nickel formed on a base material, the silver-plated product having a good bendability.

In order to accomplish the aforementioned object, the inventors have diligently studied and found that it is possible to produce a silver-plated product having a good bendability if an underlying layer of nickel has a thickness of 2 μm or less and if an area fraction in {200} orientation of a surface layer of silver is 15% or more, in a silver-plated product wherein the surface layer is formed on the surface of the underlying layer formed on a base material. Thus, the inventors have made the present invention.

According to the present invention, a silver-plated product comprises: a base material; an underlying layer of nickel which is formed on the base material; and a surface layer of silver which is formed on a surface of the underlying layer, wherein the underlying layer has a thickness of 2 μm or less, and an area fraction in {200} orientation of the surface layer is 15% or more. In this silver-plated product, the base material is preferably made of copper or a copper alloy. The surface layer preferably has a thickness of 10 μm or less.

According to the present invention, there is provided a contact or terminal part which is made of the above-described silver-plated product.

Throughout the specification, the expression "area fraction in {200} orientation" means a percentage (%) of an area occupied by crystals having {200} orientation directed to a normal direction (ND) to the surface of a silver-plated product (with a permissible deviation in angle of 10° or less), with respect to the area of the surface of the silver-plated product.

According to the present invention, it is possible to produce a silver-plated product, which has a good bendability, the silver-plated product comprising a base material, an underlying layer of nickel formed on the base material, and a surface layer of silver formed on the surface of the underlying layer.

BEST MODE FOR CARRYING OUT THE INVENTION

In the preferred embodiment of a silver-plated product according to the present invention, the silver-plated product comprising a base material, an underlying layer of nickel formed on the base material, and a surface layer of silver formed on the surface of the underlying layer, the thickness of the underlying layer is 2 μm or less, preferably 1.5 μm or less, and the area fraction in {200} orientation of the surface layer is 15% or more, preferably 25% or more.

If the area fraction in {200} orientation of the surface layer of silver is thus 15% or more, the dislocation density in the surface layer can be decreased to reduce the generation of shear band when the silver-plated product is bent. If the underlying layer of nickel is coated with such a surface layer having a good bendability, it is possible to improve the bendability of the whole silver-plated product.

In this silver-plated product, the base material is preferably made of copper or a copper alloy, and the surface layer preferably has a thickness of 10 μm or less.

The surface layer of silver of the silver-plated product can be formed by electroplating in a silver plating solution which comprises silver potassium cyanide ($KAg(CN)_2$), potassium cyanide (KCN), and 3 to 30 mg/L of potassium selenocyan ate (KSeCN) and wherein the concentration of selenium in the silver plating solution is 5 to 15 mg/L, the mass ratio of silver to free cyanogen being in the range of from 0.9 to 1.8. During the electroplating, the temperature of the solution is preferably 10 to 40° C., more preferably 15 to 30° C., and the current density is preferably 1 to 15 $A/dm^2$, more preferably 3 to 10 $A/dm^2$.

Examples of a silver-plated product according to the present invention will be described below in detail.

EXAMPLE 1

First, a pure copper plate having a size of 67 mm×50 mm×0.3 mm was prepared as a material to be plated. The material to be plated and a SUS plate were put in an alkali degreasing solution to be used as a cathode and an anode, respectively, to carry out electrolytic degreasing at 5 V for 30 seconds. The material thus electrolytic-degreased was washed, and then, pickled for 15 seconds in a 3% sulfuric acid. The pretreatment of the material to be plated was thus carried out.

Then, the pretreated material to be plated and a nickel electrode plate were used as a cathode and an anode, respectively, to electroplate (nickel-strike plate) the material at a current density of 2 $A/dm^2$ for 10 seconds in a nickel strike plating solution comprising 150 g/L of nickel chloride and 3 wt % of hydrochloric acid while stirring the solution at 400 rpm by a stirrer.

Then, the nickel-strike-plated material to be plated and an SK nickel electrode plate were used as a cathode and an anode, respectively, to electroplate (nickel-plate) the material at a current density of 2 $A/dm^2$ and a liquid temperature of 50° C. in a nickel plating solution comprising 350 g/L of nickel sulfamate, 20 g/L of nickel chloride and 35 g/L of boric acid while stirring the solution at 400 rpm by a stirrer, until a nickel plating film having a thickness of 0.01 μm was formed. The nickel plating film was thus formed as an underlying layer.

Then, the nickel-plated material to be plated and a titanium electrode plate coated with platinum were used as a cathode and an anode, respectively, to electroplate (silver-strike-plate) the material at a current density of 2.5 $A/dm^2$ for 10 seconds in a silver strike plating solution comprising 3 g/L of silver potassium cyanide and 90 g/L of potassium cyanide while stirring the solution at 400 rpm by a stirrer.

Then, the silver-strike-plated material to be plated and a silver electrode plate were used as a cathode and an anode, respectively, to electroplate the material at a current density of 5.0 $A/dm^2$ and a liquid temperature of 18° C. in a silver plating solution comprising 148 g/L of silver potassium cyanide ($K[Ag(CN)_2]$), 140 g/L of potassium cyanide (KCN) and 18 mg /L of potassium selenocyan ate (KSeCN) while stirring the solution at 400 rpm by a stirrer, until a silver plating film having a thickness of 3 μm was formed. Furthermore, the concentration of selenium in the used silver plating solution was 10 mg/L, and the concentration of silver therein was 80 g/L. In addition, the concentration of free cyanogen therein was 56 g/L, and the mass ratio of silver to free cyanogen therein was 1.44.

With respect to a silver-plated product thus produced, an area fraction in {200} orientation thereof was calculated. There were also evaluated the bendability (bad way (BW) bendability) thereof when the bending axis of the silver-plated product was extended in a rolling direction (LD) of the base material, and the bendability (good way (GW) bendability when the bending axis of the silver-plated product was extended in a direction TD (a direction perpendicular to the rolling direction and thickness direction of the base material).

The area fraction in {200} orientation of the silver-plated product was obtained by calculating a proportion occupied by crystals having {200} orientation directed to a normal direction (ND) to the surface of the silver-plated product (with a permissible deviation in angle of 10° or less), by the electron backscatter diffraction (EBSD) using a crystal analysis tool for scanning electron microscope (OIM produced by TSL solutions Co., Ltd.), after measuring a square of 100 μm×100 μm on the surface of the silver-plated product at a step of 0.4 μm by means of a thermal field emission-type scanning electron microscope (JSM-7800 F produced by JEOL Ltd.). As a result, the area fraction in {200} orientation was 42.0%. The theoretical value of the area fraction in {200} orientation of a silver-plated product having non-orientation (an imaginary silver-plated product wherein crystals forming a silver plating film are oriented at random) is about 4.4%. As compared with this silver-plated product having non-orientation, most of crystals in the silver plating film of the surface layer of the silver-plated product in this example are strongly oriented so that {200} plane is directed to the surface (plate surface) of the silver-plated product ({200} orientation is directed to the normal direction (ND) to the surface of the silver-plated product).

The bendability of the silver-plated product was evaluated on the basis of the presence of exposure of the base material in a bent portion of the silver-plated product by observing the bent portion at a power of 1000 by means of a microscope (Digital Microscope VHX-1000 produced by KEYENCE CORPORATION) after the silver-plated product was bent by 90 degrees at R=0.3 and R=0.5, respectively, in a direction, in which the bending axis of the silver-plated product was extended in a rolling direction (LD) of the base material with respect to the BW bendability and in which the bending axis of the silver-plated product was extended in a direction TD (a direction perpendicular to the rolling direction and thickness direction of the base material) with respect to the GW bendability, in accordance with the V-block method described on Japanese Industrial Standard (JIS) Z2248. As a result, in all cases, the exposure of the base material was not observed, so that the bendability of the silver-plated product was good.

EXAMPLE 2

A silver-plated product was produced by the same method as that in Example 1, except that the thickness of the nickel plating film serving as the underlying layer was 0.2 μm.

With respect to the silver-plated product thus produced, the area fraction in {200} orientation thereof was calculated by the same method as that in Example 1, and the BW bendability and GW bendability thereof were evaluated by the same methods as those in Example 1. As a result, the area fraction in {200} orientation was 43.1%. In all cases in the evaluation of the BW bendability and GW bendability, the exposure of the base material was not observed, so that the bendability of the silver-plated product was good.

EXAMPLE 3

A silver-plated product was produced by the same method as that in Example 1, except that the thickness of the nickel plating film serving as the underlying layer was 1.0 μm.

With respect to the silver-plated product thus produced, the area fraction in {200} orientation thereof was calculated by the same method as that in Example 1, and the BW bendability and GW bendability thereof were evaluated by the same methods as those in Example 1. As a result, the area fraction in {200} orientation was 41.2%. In all cases in the evaluation of the BW bendability and GW bendability, the exposure of the base material was not observed, so that the bendability of the silver-plated product was good.

EXAMPLE 4

A silver-plated product was produced by the same method as that in Example 1, except that the thickness of the nickel plating film serving as the underlying layer was 1.5 μm.

With respect to the silver-plated product thus produced, the area fraction in {200} orientation thereof was calculated by the same method as that in Example 1, and the BW bendability and GW bendability thereof were evaluated by the same methods as those in Example 1. As a result, the area fraction in {200} orientation was 42.2%. In the evaluation of the BW bendability and GW bendability, in either case when the silver-plated product was bent at R=0.3, the exposure of the base material was observed, so that the bendability of the silver-plated product was not good. However, in either case when the silver-plated product was bent at R=0.5, the exposure of the base material was not observed, so that the bendability of the silver-plated product was good.

Comparative Example 1

A silver-plated product was produced by the same method as that in Example 2, except that a silver plating solution comprising 148 g/L of silver potassium cyanide, 140 g/L of potassium cyanide and 73 mg/L of potassium selenocyanate was used for carrying out the silver plating. Furthermore, the concentration of selenium in the used silver plating solution was 40 mg /L, and the concentration of silver therein was 80 g/L. In addition, the concentration of free cyanogen therein was 56 g/L, and the mass ratio of silver to free cyanogen therein was 1.44.

With respect to the silver-plated product thus produced, the area fraction in {200} orientation thereof was calculated by the same method as that in Example 1, and the BW bendability and GW bendability thereof were evaluated by the same methods as those in Example 1. As a result, the area fraction in {200} orientation was 5.2% . In all cases in the evaluation of the BW bendability and GW bendability, the exposure of the base material was observed, so that the bendability of the silver-plated product was not good.

Comparative Example 2

A silver-plated product was produced by the same method as that in Example 2, except that a silver plating solution comprising 148 g/L of silver potassium cyanide and 140 g/L of potassium cyanide (containing no potassium selenocyan ate) was used for carrying out the silver plating. Furthermore, the concentration of selenium in the used silver plating solution was 0 mg/L, and the concentration of silver therein was 80 g/L. In addition, the concentration of free cyanogen therein was 56 g/L, and the mass ratio of silver to free cyanogen therein was 1.44.

With respect to the silver-plated product thus produced, the area fraction in {200} orientation thereof was calculated by the same method as that in Example 1, and the BW bendability and GW bendability thereof were evaluated by the same methods as those in Example 1. As a result, the area fraction in {200} orientation was 3.2% . In all cases in the evaluation of the BW bendability and GW bendability, the exposure of the base material was observed, so that the bendability of the silver-plated product was not good.

The producing conditions and evaluated results of the silver-plated product in each of Examples and Comparative Examples are shown in Tables 1 and 2, respectively.

TABLE 1

| | Thickness of Underlying Layer (μm) | Composition of Silver Plating Bath K[Ag(CN)$_2$] (g/L) | KCN (g/L) | KSeCN (mg/L) |
|---|---|---|---|---|
| Example 1 | 0.01 | 148 | 140 | 18 |
| Example 2 | 0.2 | 148 | 140 | 18 |
| Example 3 | 1.0 | 148 | 140 | 18 |
| Example 4 | 1.5 | 148 | 140 | 18 |
| Comp. 1 | 0.2 | 148 | 140 | 73 |
| Comp. 2 | 0.2 | 148 | 140 | 0 |

TABLE 2

| | Area Fraction in {200} (%) | Bendability R = 0.3 GW Bending | R = 0.5 GW Bending | R = 0.3 BW Bending | R = 0.5 BW Bending |
|---|---|---|---|---|---|
| Example 1 | 42.0 | No Cracks | No Cracks | No Cracks | No Cracks |
| Example 2 | 43.1 | No Cracks | No Cracks | No Cracks | No Cracks |
| Example 3 | 41.2 | No Cracks | No Cracks | No Cracks | No Cracks |
| Example4 | 42.2 | Cracks | No Cracks | Cracks | No Cracks |
| Comp. 1 | 5.2 | Cracks | Cracks | Cracks | Cracks |
| Comp. 2 | 3.2 | Cracks | Cracks | Cracks | Cracks |

As can be seen from Tables 1 and 2, the silver-plated product in each of Examples 1 through 4, wherein the thickness of the underlying layer of nickel is 2 μm or less and wherein the area fraction in {200} orientation of the silver plating film is 15% or more, has a good bendability.

The invention claimed is:

1. A silver-plated product comprising:

a base material of copper or a copper alloy;

an underlying layer of nickel which is formed on the base material; and a surface layer of silver which is formed on a surface of the underlying layer, wherein the underlying layer has a thickness of 2 μm or less, and an area fraction in {200} orientation of the surface layer is 41.2% or more.

2. A silver-plated product as set forth in claim 1, wherein said surface layer has a thickness of 10 μm or less.

3. A contact or terminal part which is made of a silver-plated product as set forth in claim 1 or 2.

* * * * *